US012592596B2

(12) United States Patent
Fedida et al.

(10) Patent No.: US 12,592,596 B2
(45) Date of Patent: Mar. 31, 2026

(54) RELUCTANCE ASSISTED AXIAL FLUX ELECTRIC MOTOR

(71) Applicant: GM GLOBAL TECHNOLOGY OPERATIONS LLC, Detroit, MI (US)

(72) Inventors: Vincent Fedida, Shanghai (CN); Alan G. Holmes, Clarkston, MI (US); Chengwu Duan, Shanghai (CN); Jian Yao, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 313 days.

(21) Appl. No.: 18/506,185

(22) Filed: Nov. 10, 2023

(65) Prior Publication Data

US 2025/0112512 A1      Apr. 3, 2025

(30) Foreign Application Priority Data

Sep. 28, 2023    (CN) .......................... 202311285744.8

(51) Int. Cl.
*H02K 1/2798*      (2022.01)
*H02K 1/24*      (2006.01)
*H02K 16/02*      (2006.01)

(52) U.S. Cl.
CPC ............. *H02K 1/2798* (2022.01); *H02K 1/24* (2013.01); *H02K 16/02* (2013.01)

(58) Field of Classification Search
CPC ......... H02K 1/2798; H02K 16/02; H02K 1/24
USPC ..................................................... 310/156.37
See application file for complete search history.

(56) References Cited

U.S. PATENT DOCUMENTS

| | | | | |
|---|---|---|---|---|
| 2012/0228978 A1* | 9/2012 | Petro | ........................ | H02K 1/14 |
| | | | | 310/156.38 |
| 2013/0088112 A1* | 4/2013 | Cho | ..................... | H02K 1/2798 |
| | | | | 310/156.37 |
| 2018/0138793 A1* | 5/2018 | Kelly | ....................... | H02K 1/02 |
| 2018/0198335 A1 | 7/2018 | Inoue et al. | | |

(Continued)

FOREIGN PATENT DOCUMENTS

| | | |
|---|---|---|
| CN | 210780279 U | 6/2020 |
| CN | 114825696 A | 7/2022 |
| CN | 115498841 A | 12/2022 |

(Continued)

OTHER PUBLICATIONS

German Office Action dated Jun. 20, 2024.

*Primary Examiner* — Christopher M Koehler
*Assistant Examiner* — Ahmed F Seck
(74) *Attorney, Agent, or Firm* — Quinn IP Law

(57) ABSTRACT

A rotor for mounting on a rotational axis in an axial flux electric motor includes a ferromagnetic rotor core. The rotor also includes a plurality of alternating south and north pole permanent magnets (PMs) arranged on the ferromagnetic rotor core symmetrically around the rotational axis and facing the stator. The ferromagnetic rotor core includes a plurality of core saliencies extending to the rotor exterior surface. Each of the core saliencies is arranged between one south pole PM and one north pole PM. The plurality of core saliencies is phase-angle shifted relative to the plurality of alternating south and north pole PMs to thereby alter magnetic reluctance of the electric motor. An axial flux electric motor employing the above-described rotor is also contemplated.

20 Claims, 6 Drawing Sheets

(56) References Cited

U.S. PATENT DOCUMENTS

| 2021/0152040 | A1* | 5/2021 | Yao | H02K 1/02 |
| 2022/0166268 | A1* | 5/2022 | Duan | H02K 21/24 |

FOREIGN PATENT DOCUMENTS

| DE | 102023122823 | A1 | 3/2024 |
| KR | 1020230100314 | A | 7/2023 |

* cited by examiner

RELUCTANCE ASSISTED AXIAL FLUX ELECTRIC MOTOR

CROSS-REFERENCE TO RELATED APPLICATIONS

This application claims priority to and the benefit of Chinese Patent Application No. CN202311285744.8, which was filed on Sep. 28, 2023, and which is hereby incorporated by reference in its entirety.

INTRODUCTION

The disclosure relates to a magnetic reluctance assisted axial flux electric motor.

An electric motor is a machine that converts electric energy into mechanical energy. An electric motor's operation is based on an electromagnetic interaction between permanent magnets and the magnetic field created by the machine's selectively energized coils. Electric motors are classified into two categories based on the direction of the magnetic field-axial flux motors and radial flux motors. Arrangement of the gap between the machine's rotor and stator, positioned parallel to the axis of rotation in an axial flux motor and radially in the radial flux motor, determines the direction of the motor's magnetic flux.

Axial and radial flux motors may be configured as switched reluctance machines. Generally, a reluctance machine induces non-permanent magnetic poles on the ferromagnetic rotor. The rotor of such a machine normally does not have windings and generates torque through magnetic reluctance. Reluctance machine subtypes include synchronous, variable, switched and variable stepping motors. Reluctance motors can deliver high power density but may experience significant high load torque undulation or "torque ripple" (difference between maximum and minimum torque during one revolution) from the reluctance, if it is combined with torque from magnets, which may also generate noise.

Typically, axial flux motors have a comparatively denser and shorter flux flow path. Additionally, rotor magnets may be located further away from the axial motor's central rotating axis as compared to radial flux motors. As a result, axial flux motors generally have a higher torque-to-weight and torque-to-size ratio versus radial flux motors. The magnets on the rotor of an axial flux motor, like all forms of AC synchronous electric motors, are attracted to the spinning field generated by a surrounding ring of independent electromagnets in the stator. Because the switching of the magnets that causes the field to revolve is typically not perfectly smooth, the rotor suffers from a torque ripple.

SUMMARY

An axial flux electric motor includes a rotationally fixed stator defining a rotational axis and having a plurality of conductive stator magnetic poles arranged radially about the rotational axis. The axial flux electric motor also includes a first rotor spaced axially from one side from the stator, having a first rotor exterior surface facing the stator, and rotatably mounted coaxially with the rotational axis. The first rotor includes a first ferromagnetic rotor core and a plurality of alternating south and north pole permanent magnets (PMs) arranged on the first ferromagnetic rotor core symmetrically around the rotational axis and facing the stator. The first ferromagnetic rotor core includes a plurality of first core saliencies extending to the first rotor exterior surface. Each of the first core saliencies is arranged between one first south pole PM and one first north pole PM. The plurality of first core saliencies is phase-angle shifted relative to the plurality of alternating south and north pole PMs to thereby alter magnetic reluctance of the electric motor.

The axial flux electric motor may additionally include a second rotor spaced axially from another side from the stator, having a second rotor exterior surface facing the stator, and rotatably mounted coaxially with the rotational axis. The second rotor includes a second ferromagnetic rotor core and a second plurality of alternating south and north pole PMs arranged on the second ferromagnetic rotor core on the second rotor exterior surface symmetrically around the rotational axis. The second ferromagnetic rotor core may include a plurality of second core saliencies extending to the second rotor exterior surface. Each of the second core saliencies is arranged between one second south pole PM and one first north pole PM. The plurality of second core saliencies may be phase-aligned with or phase-angle shifted relative to the plurality of first core saliencies. The plurality of second alternating south and north pole PMs may be phase-angle shifted relative to the plurality of first alternating south and north pole PMs to thereby further alter the motor's magnetic reluctance.

In each pair of alternating south and north pole PMs of the first rotor, the respective first core saliency may be disposed angularly closer to the corresponding south pole PM than to the corresponding north pole PM.

In each pair of alternating south and north pole PMs of the first rotor, the respective core saliency may be disposed angularly closer to the corresponding north pole PM than to the corresponding south pole PM.

Each of the plurality of alternating south and north pole PMs of the first rotor may be a respective PM set including a comparatively high radial span PM and a comparatively low radial span PM.

In each PM set, the comparatively low radial span PM may be arranged radially closer to the rotational axis than the comparatively high radial span PM.

In each PM set, the comparatively high radial span PM may be arranged radially closer to the rotational axis than the comparatively low radial span PM.

Each of the first core saliencies may be embedded in the respective PM set adjacent to the comparatively low radial span PM.

In each PM set, the comparatively high radial span PM and the comparatively low radial span PM may be radially disposed to generate a radially straight PM set edge opposite the embedded saliency.

In each PM set, the embedded saliency may extend to overlap an edge of at least one of the comparatively high radial span PM and the comparatively low radial span PM, to thereby mechanically retain the respective PM on the first rotor.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
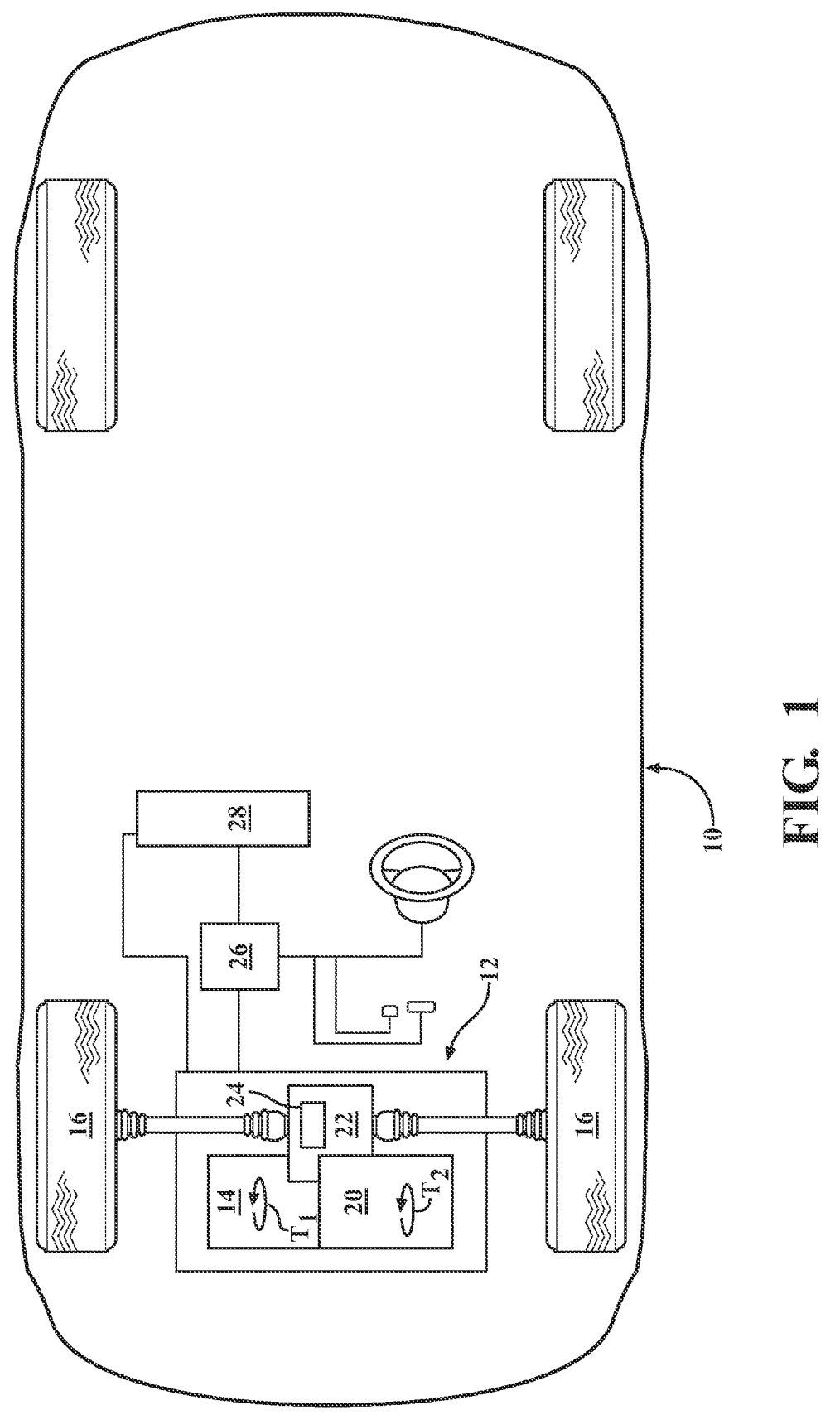
FIG. 1 is a schematic illustration of a motor vehicle having a powertrain employing an axial flux electric motor-generator for propulsion.

Embodiments of the present disclosure as described herein are intended to serve as examples. Other embodiments may take various and alternative forms. Additionally, the drawings are generally schematic and not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Certain terminology may be used in the following description for the purpose of reference, and thus are not intended to be limiting. For example, terms such as "above" and "below" refer to directions in the drawings to which reference is made. Terms such as "front", "back", "fore", "aft", "left", "right", "rear", and "side" describe the orientation and/or location of portions of the components or elements within a consistent but arbitrary frame of reference, which is made clear by reference to the text and the associated drawings describing the components or elements under discussion. Moreover, terms such as "first", "second", "third", and so on may be used to describe separate components. Such terminology may include the words specifically mentioned above, derivatives thereof, and words of similar import.

Referring to FIG. 1, a motor vehicle 10 having a powertrain 12 is depicted. The vehicle 10 may include, but not be limited to, a commercial vehicle, industrial vehicle, passenger vehicle, aircraft, watercraft, train or the like. It is also contemplated that the vehicle 10 may be a mobile platform, such as an airplane, all-terrain vehicle (ATV), boat, personal movement apparatus, robot and the like to accomplish the purposes of this disclosure. The powertrain 12 includes a first power-source 14 depicted as an electric motor-generator and configured to generate a first power-source torque T1 (shown in FIG. 1) for propulsion of the vehicle 10 via driven wheels 16, such as relative to a road surface. The motor-generator 14 is configured as a reluctance machine in which non-permanent magnetic poles are induced on the motor's ferromagnetic rotor(s) to be described in detail below.

As shown in FIG. 1, the powertrain 12 may also include a second power-source 20, such as an internal combustion engine configured to generate a second power-source torque T2. The power-sources 14 and 20 may act in concert to power the vehicle 10 and be operatively connected to a transmission assembly 22. The transmission assembly 22 may be configured to transmit first and/or second power-source torques T1, T2 to a final drive unit 24, which in turn may be connected to the driven wheels 16. The first power-source 14, which for the remainder of the present disclosure will be referred to as a motor-generator, may, for example, be mounted to the second power-source 20, mounted to (or incorporated into) the transmission assembly 22, mounted to the final drive unit 24, or be a stand-alone assembly mounted to the structure of the vehicle 10. As shown, the vehicle 10 additionally includes a programmable electronic controller 26 configured to control the powertrain 12 to generate a predetermined amount of power-source torque T, and various other vehicle systems. The vehicle 10 additionally includes an energy storage system 28, such as one or more batteries, configured to generate and store electrical energy for powering the power-sources 14 and 20.

Figure 2:
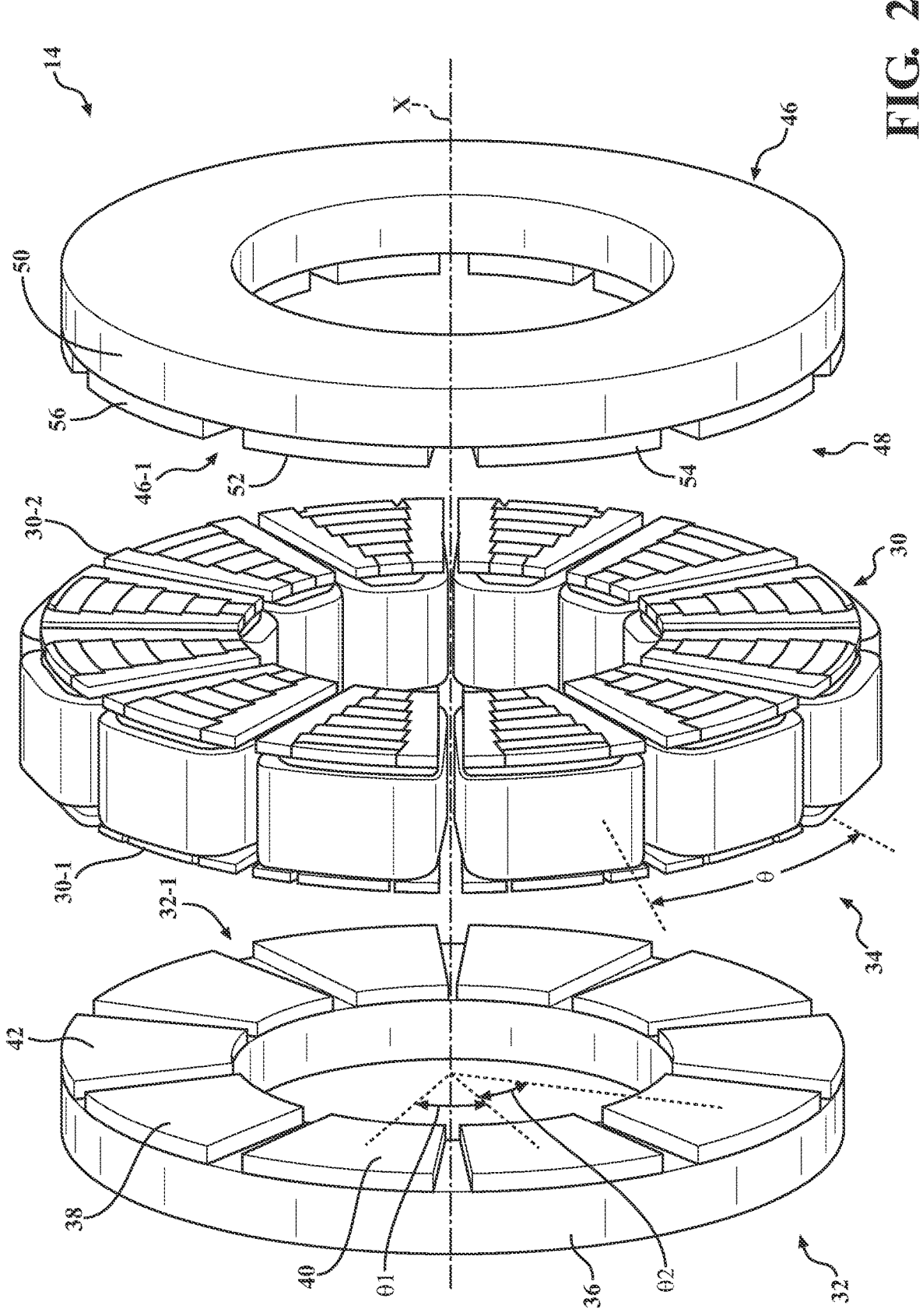
FIG. 2 is a schematic, close-up, exploded partial perspective view of the motor-generator shown in FIG. 1, depicting a stator assembly with first and second rotors, each having alternating south and north pole permanent magnets (PMs) and core saliencies arranged therebetween, according to an embodiment of the disclosure.

As shown in FIG. 2, the motor-generator 14 includes a rotationally fixed stator 30. The stator 30 defines a rotational axis X and includes a stator core 30A and a plurality of magnetic poles 30B arranged radially about the rotational axis. The stator 30 has two opposing sides-a first side 30-1 and a second side 30-2. The motor-generator 14 also includes a first rotor 32 spaced axially from the first side 30-1 of the stator 30 creating an airgap 34 therebetween. The first rotor 32 is rotatably mounted coaxially with the rotational axis X and has a first rotor exterior surface 32-1 facing the stator 30. The first rotor 32 includes a first ferromagnetic rotor core 36. The first rotor core 36 may be constructed from a relatively soft magnetic material, such as laminated silicon steel, which has a plurality of first core protrusions or saliencies 38 acting as magnetic poles via magnetic reluctance. Magnetic reluctance is defined as the ratio of magnetomotive force (mmf) to magnetic flux, representing the opposition to magnetic flux, and generally depends on the geometry and composition of an object. As shown, the first core saliencies 38 extend to the first rotor exterior surface 32-1. During operation of the motor-generator 14, non-permanent magnetic poles are successively induced on the motor's saliency magnetic poles 38 to generate motor torque.

Figure 3A:
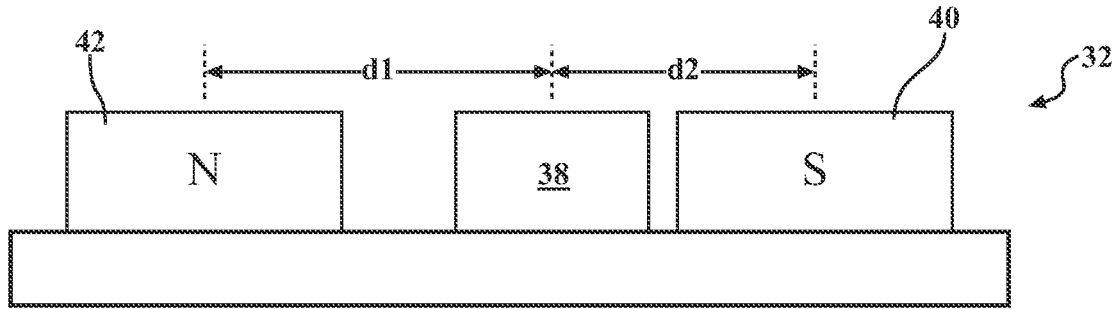
FIG. 3A is a schematic cross-sectional partial side view of the first rotor assembly shown in FIG. 2, depicting an embodiment of a phase-angle shift between the first core saliencies and the plurality of alternating first south and north pole PMs, according to an embodiment of the disclosure.
Figure 3B:
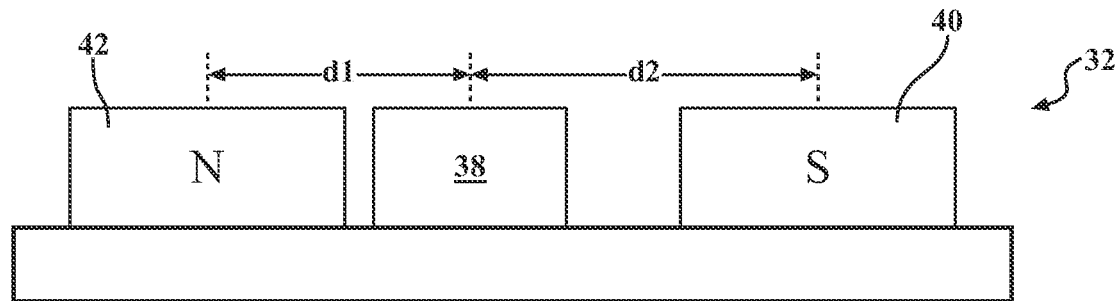
FIG. 3B is a schematic cross-sectional partial side view of the first rotor assembly shown in FIG. 2, depicting another embodiment of the phase-angle shift between the first core saliencies and the plurality of first alternating south and north pole PMs, according to an embodiment of the disclosure.

The first rotor 32 also includes a plurality of first alternating south pole permanent magnets (PMs) 40 and north pole PMs 42. The south and north pole PMs 40, 42 are arranged on the first ferromagnetic rotor core 36 substantially symmetrically around the rotational axis X and facing the stator 30. Each pair of alternating south and north pole PMs 40, 42 includes one of the first core saliencies 38 arranged therebetween. In other words, each of the first core saliencies 38 is arranged or sandwiched between one first south pole PM 40 and one first north pole PM 42. The plurality of first core saliencies 38, as whole, is phase-angle shifted relative to the plurality of first alternating south and north pole PMs 40, 42. A "phase shift" of the first core saliencies 38 relative to the PMs 40, 42 is herein defined as each core saliency being positioned at uneven or unequal radial distance or angle θ, from its two neighboring or bracketing PMs. For example, angle θ1 may be greater than angle θ2. In other words, in each pair of alternating south and north pole PMs 40, 42, the respective core saliency 38 sandwiched thereby is disposed radially asymmetrically between the respective south pole permanent PM and the corresponding north pole PM, as shown in FIGS. 3A and 3B. The subject phase-angle shift of the first core saliencies 38 relative to the alternating south and north pole PMs 40, 42 is configured to alter a magnetic reluctance of the motor-generator 14 in comparison to a motor-generator structure having a symmetrical arrangement of the core saliencies relative to the corresponding alternating south and north pole PMs.

Figure 4A:
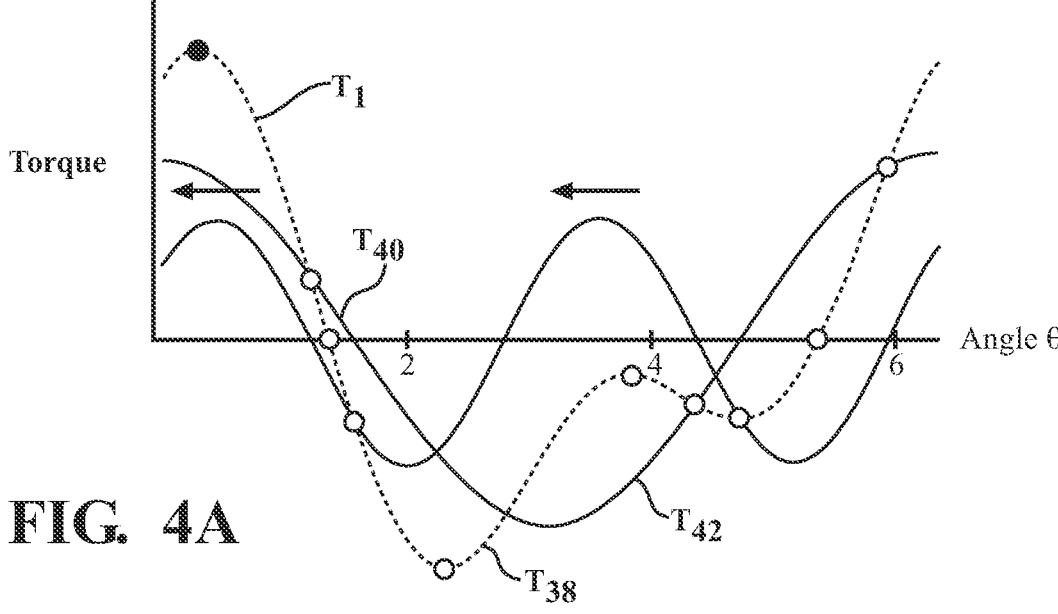
FIG. 4A is a graphical decision of the effect phase-angle shift shown in FIG. 3A on electric motor output torque, according to the disclosure.
Figure 4B:
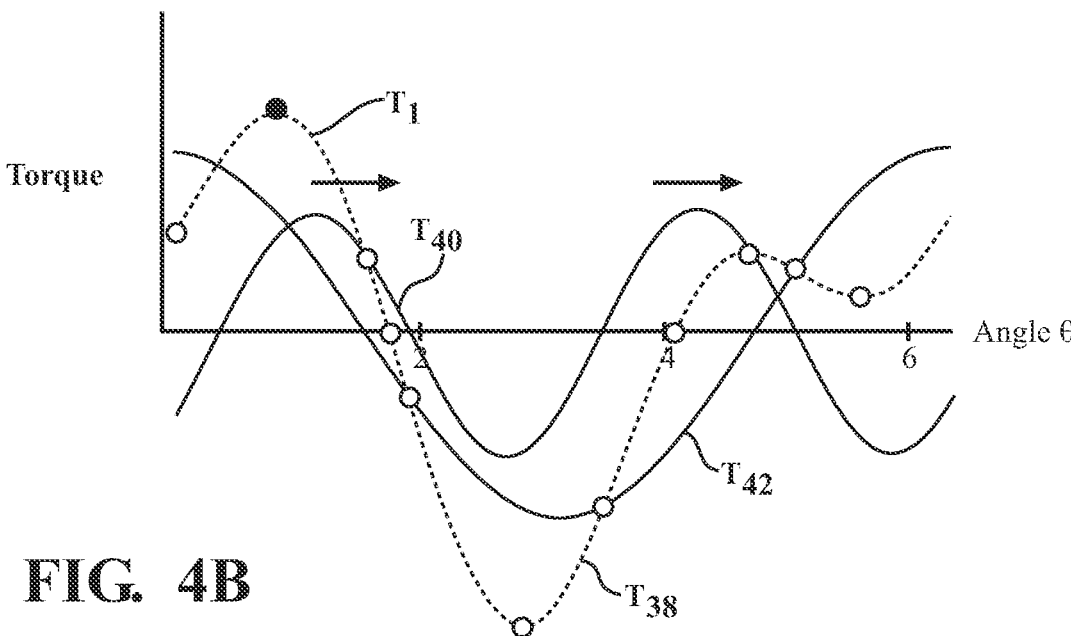
FIG. 4B is a graphical decision of the effect phase-angle shift shown in FIG. 3B on electric motor output torque, according to the disclosure.

FIG. 3A depicts a cross-sectional view of the rotor 32, wherein, in each pair of alternating south and north pole PMs 40, 42, the respective core saliency 38 is disposed angularly closer to the corresponding south pole PM 40 than to the corresponding north pole PM 42. The subject phase shift in FIG. 3A is indicated via distance d1 being greater than distance d2. Alternatively, as shown in FIG. 3B, in each pair of alternating south and north pole PMs 40, 42, the respective core saliency 38 may be disposed angularly closer to the corresponding north pole PM 42 than to the corresponding south pole PM 40. The subject phase shift in FIG. 3B is indicated via distance d1 being smaller than distance d2. The embodiment of the first rotor 32 shown in FIG. 3A is configured to increase the overall torque output of the motor-generator 14 and may also affect the torque ripple, while the embodiment of the first rotor 32 shown in FIG. 3B is configured to decrease the overall torque output. Comparative torque plots are shown in FIGS. 4A and 4B, depicting alignment of PM torque ($T_{40}$, $T_{42}$) relative to reluctance torque ($T_{38}$) in a representative motor-generator relative to angular shift between PMs 40 and 42 and the sandwiched saliency 38. FIGS. 4A and 4B specifically respectively illustrate increased torque output T1 corresponding to the embodiment of FIG. 3A and reduced torque output T1 corresponding to the embodiment of FIG. 3B.

Figures 5A, 5B, 5C:
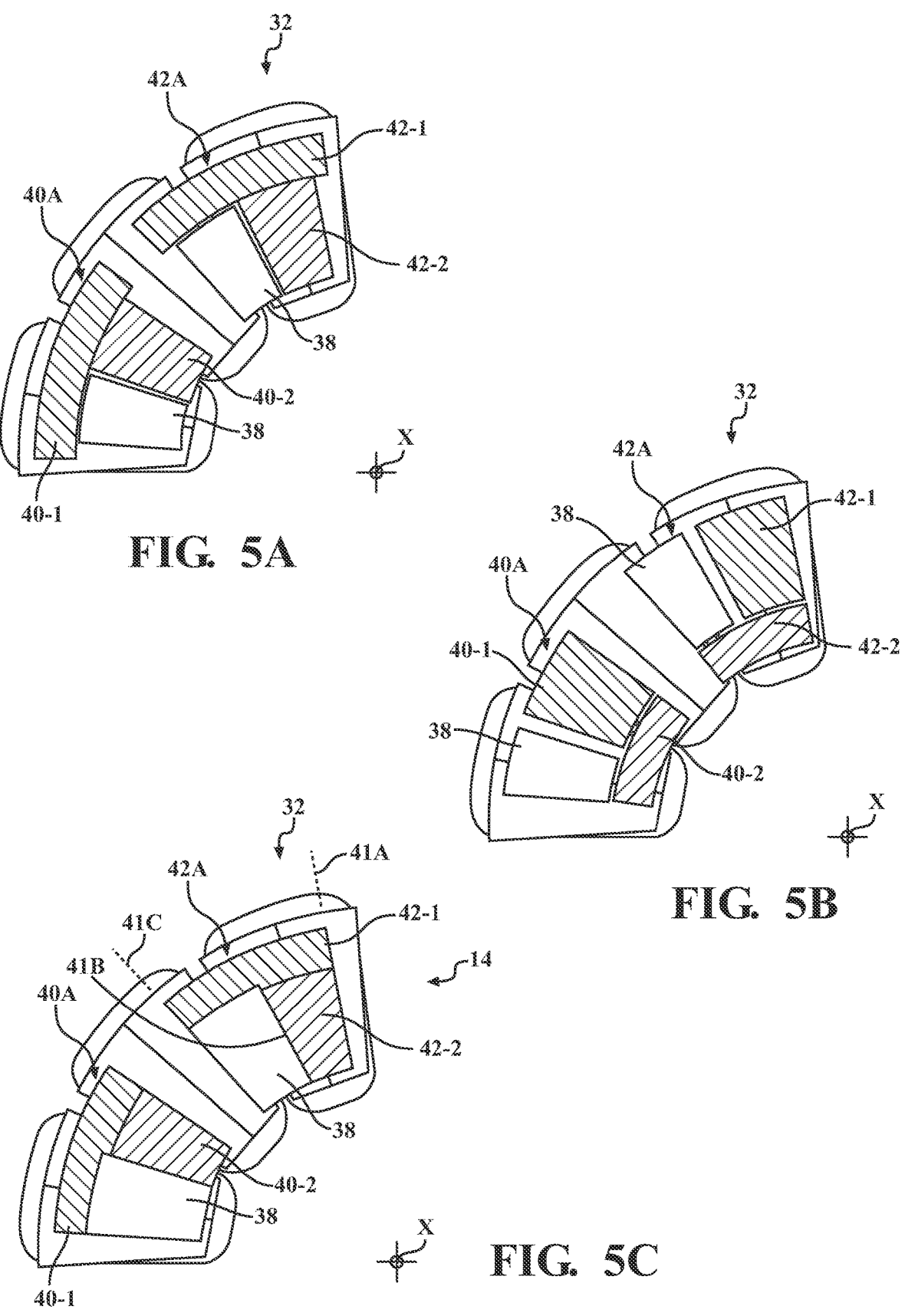
FIG. 5A is a schematic cross-sectional partial front view of the first rotor shown in FIG. 2, depicting an embodiment of alternating south and north pole PMs configured as a respective PM set having a comparatively high radial span PM and a comparatively low radial span PM, according to the disclosure.
FIG. 5B is a schematic cross-sectional partial front view of the first rotor shown in FIG. 2, depicting another embodiment of alternating south and north pole PM sets, according to the disclosure.
FIG. 5C is a schematic cross-sectional partial front view of the first rotor shown in FIG. 2, depicting respective south and north pole PM sets, each having a radially straight PM set edge aligned opposite the corresponding embedded saliency and the embedded saliency mechanically retaining the respective PM, according to the disclosure.

As shown in FIGS. 5A and 5B, each of the plurality of first alternating south and north pole PMs 40, 42 may be identified as a respective PM set 40A and 42A. Each PM set 40A may include a comparatively high radial span PM 40-1 and a comparatively low radial span PM 40-2. Similarly, each PM set 42A may include a comparatively high radial span PM 42-1 and a comparatively low radial span PM 42-2. As shown in FIG. 5A, in each respective PM set 40A, 42A, the comparatively low radial span PM 40-2, 42-2 may be arranged radially closer to the rotational axis X than the corresponding comparatively high radial span PM 40-1, 42-1. Alternatively, as shown in FIG. 5B, in each respective PM set 40A, 42A, the comparatively high radial span PM 40-1, 42-1 may be arranged radially closer to the rotational axis X than the corresponding comparatively low radial span PM 40-2, 42-2. Each PM set 40A and 42A may have an overall T-shape as shown in FIG. 5A.

Each of the first core saliencies 38, arranged between each pair of alternating south and north pole PMs 40, 42, may be embedded in the respective PM set 40A, 42A adjacent to the corresponding comparatively low radial span PM 40-2, 42-2 (shown in FIGS. 5A and 5B). In each PM set 40A, 42A, the comparatively high radial span PM 40-1, 42-1 and the comparatively low radial span PM 40-2, 42-2 may be radially disposed to generate a respective PM set edge 41A opposite the corresponding embedded saliency 38, an opposing side of the comparatively low radial span PM 40-2, 42-2 edge 41B, and opposite edge 41C, as shown in FIG. 5C. As shown, the PM set edge 41A may be constructed as radially substantially straight, where the edges of PMs 40-1, 42-1 are aligned with each other and edges of PMs 40-2, 42-2 are similarly aligned. Additionally, the opposite edges 41C of the PM sets 40A, 42A may also be substantially straight and aligned with the outer edge of the corresponding embedded saliency 38. As shown in FIG. 5C, in each PM set 40A, 42A, the embedded saliency 38 may extend to overlap the edge 41B of the comparatively low radial span PM 40-2, 42-2 and/or a portion of the neighboring comparatively high radial span PM 40-1, 42-1. The subject overlap between the saliency 38 and the nearby PM may be employed to mechanically retain the respective PM on the first rotor 32.

With resumed reference to FIG. 2, the motor-generator 14 may additionally include a second rotor 46 spaced axially from the second side 30-2 of the stator 30 creating an airgap 48 therebetween. As shown, the second rotor 46 is rotatably mounted coaxially with the rotational axis X and has a second rotor exterior surface 46-1 facing the stator 30. The second rotor 46 includes a second ferromagnetic rotor core 50 constructed generally like the first rotor core 36 and having a plurality of second core saliencies 52. The second core saliencies 52 extend to the second rotor exterior surface 46-1 and act as magnetic poles through magnetic reluctance. The second rotor 46 also includes a plurality of second alternating south and north pole PMs 54, 56 arranged on the second ferromagnetic rotor core 50 substantially symmetrically around the rotational axis X and facing the stator 30.

Figure 6:
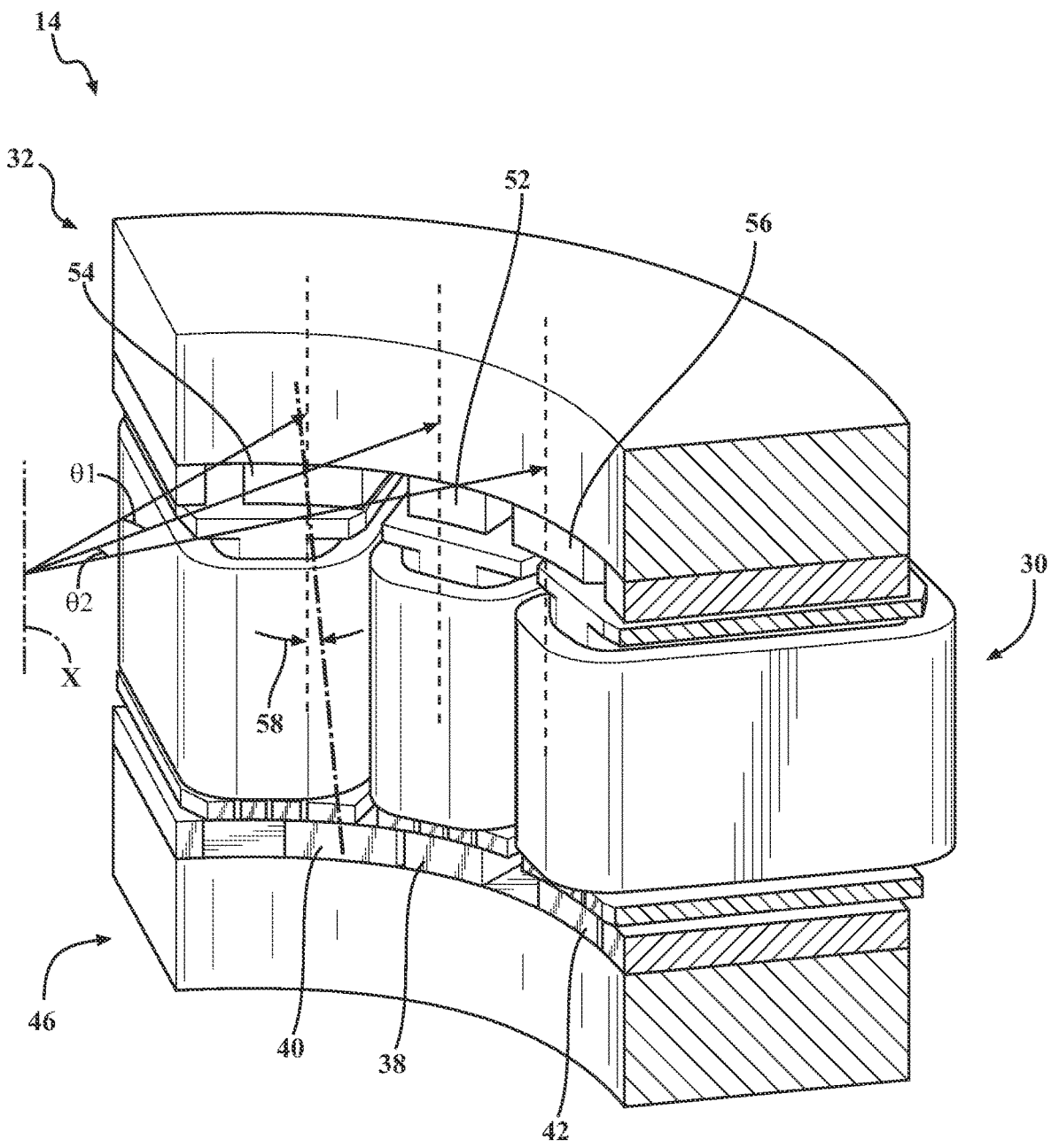
FIG. 6 is a schematic partial perspective view of the motor-generator shown in FIG. 2, depicting the second core saliencies phase-aligned with the plurality of first core saliency and the second plurality of alternating south and north pole PMs phase-angle shifted relative to the first plurality of alternating south and north pole PMs, according to the disclosure.

As shown, and analogous to the first rotor 32, each of the second core saliencies 52 is arranged between one second south pole PM 54 and one second north pole PM 56. The second core saliencies 52 may be phase-aligned, i.e., not shifted, with the plurality of second south and north pole PMs 54, 56, such that the distances d1 and d2 shown in FIGS. 3A and 3B are substantially equal. As installed in the motor-generator 14, the plurality of second core saliencies 52 may also be phase-aligned with the plurality of first core saliencies 38. On the other hand, the plurality of second alternating south and north pole PMs 54, 56 may be phase-angle shifted relative to the plurality of first alternating south and north pole PMs 40, 42, as shown in FIG. 6. The phase-angle shift of alternating south and north pole PMs 54, 56 relative to the alternating south and north pole PMs 40, 42 generates a positional skew 58 of the first rotor PMs relative to the second rotor PMs along the rotational axis X and acts to further alter the magnetic reluctance of the electric motor 14.

Additionally, the plurality of second core saliencies 52 may be phase-angle shifted relative to the plurality of first core saliencies 38 and such an arrangement may be combined with the phase-angle shifted PMs, as described above. The phase-angle shift of second core saliencies 52 relative to the first core saliencies 38 generates a positional skew (not explicitly shown but may be understood from FIGS. 3A, 3B, and 6) of the first rotor saliencies relative to the second rotor saliencies along the rotational axis X to further modify magnetic reluctance of the electric motor 14. In a further embodiment, the first and second rotors 32, 46 may be substantially identical, but when installed in the motor-generator 14, for example the rotor 46 being a substantial duplicate of the rotor 32 shown in FIG. 3A, the phase-angle shift between respective PMs and saliences of the two rotors will be out of alignment. Put another way, when two substantially identical first and second rotors 32, 46 face each other from opposite sides of the stator 30 (as shown in FIG. 2), the respective PMs and salience phase-angle shifts of the two rotors will be out of phase relative to each other. Such substantially identical oppositely mounted rotors may be similarly employed to modify magnetic reluctance of the electric motor 14.

In summary, the axial flux motor-generator 14 may have one or two rotors. One rotor has core saliencies phase-angle shifted relative to the south and north pole PMs to alter the motor's magnetic reluctance to assist torque generation in the electric motor 14. Alternating south and north pole PMs of the first rotor may be set up as individual PM sets, each including a comparatively high radial span PM and a comparatively low radial span PM. Each of the first rotor saliencies may be embedded in a respective PM set adjacent to the comparatively low radial span PM, thus achieving the desired phase-angle shift. The second rotor may have core saliencies phase-aligned with the first core saliencies, while the alternating south and north pole PMs of the second rotor may be phase-angle shifted relative to the alternating south and north pole PMs of the first rotor. The second rotor may thereby further alter the electric motor magnetic reluctance.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. An axial flux electric motor comprising:
a rotationally fixed stator defining a rotational axis and having a plurality of conductive stator magnetic poles arranged radially about the rotational axis; and
a first rotor spaced axially from one side from the stator, having a first rotor exterior surface facing the stator, and rotatably mounted coaxially with the rotational axis, wherein:
the first rotor includes a first ferromagnetic rotor core and a plurality of first alternating south and north pole permanent magnets (PMs) arranged on the first ferromagnetic rotor core symmetrically around the rotational axis and facing the stator;
the first ferromagnetic rotor core includes a plurality of first core saliencies extending to the first rotor exterior surface;
each of the first core saliencies is arranged between one first south pole PM and one first north pole PM; and
the plurality of first core saliencies is phase-angle shifted relative to the plurality of first alternating south and north pole PMs to thereby alter magnetic reluctance of the electric motor.

2. The axial flux electric motor according to claim 1, further comprising a second rotor spaced axially from another side from the stator, having a second rotor exterior surface facing the stator, and rotatably mounted coaxially with the rotational axis, wherein:
the second rotor includes a second ferromagnetic rotor core and a plurality of second alternating south and north pole PMs arranged on the second ferromagnetic rotor core symmetrically around the rotational axis and facing the stator;
the second ferromagnetic rotor core includes a plurality of second core saliencies extending to the second rotor exterior surface;
each of the second core saliencies is arranged between one second south pole PM and one second north pole PM;
the plurality of second core saliencies is phase-aligned with or phase-angle shifted relative to the plurality of first core saliencies; and
the plurality of second alternating south and north pole PMs is phase-angle shifted relative to the plurality first alternating south and north pole PMs to thereby further alter the electric motor magnetic reluctance.

3. The axial flux electric motor according to claim 1, wherein in each pair of first alternating south and north pole PMs, the respective first core saliency is disposed angularly closer to the corresponding south pole PM than to the corresponding north pole PM.

4. The axial flux electric motor according to claim 1, wherein in each pair of first alternating south and north pole PMs, the respective first core saliency is disposed angularly closer to the corresponding north pole PM than to the corresponding south pole PM.

5. The axial flux electric motor according to claim 1, wherein each of the plurality of first alternating south and north pole PMs is a respective PM set including a comparatively high radial span PM and a comparatively low radial span PM.

6. The axial flux electric motor according to claim 5, wherein, in each PM set, the comparatively low radial span PM is arranged radially closer to the rotational axis than the comparatively high radial span PM.

7. The axial flux electric motor according to claim 5, wherein, in each PM set, the comparatively high radial span PM is arranged radially closer to the rotational axis than the comparatively low radial span PM.

8. The axial flux electric motor according to claim 5, wherein each of the first core saliencies is embedded in the respective PM set adjacent to the comparatively low radial span PM.

9. The axial flux electric motor according to claim 8, wherein, in each PM set, the comparatively high radial span PM and the comparatively low radial span PM are radially disposed to generate a radially straight PM set edge opposite the embedded saliency.

10. The axial flux electric motor according to claim 8, wherein, in each PM set, the embedded saliency extends to overlap an edge of at least one of the comparatively high radial span PM and the comparatively low radial span PM, to thereby mechanically retain the respective PM on the first rotor.

11. A rotor for mounting on a rotational axis in an axial flux electric motor, comprising:
   a ferromagnetic rotor core; and
   a plurality of alternating south and north pole permanent magnets (PMs) arranged on the ferromagnetic rotor core symmetrically around the rotational axis;
   wherein:
      the ferromagnetic rotor core includes a plurality of core saliencies extending to the rotor exterior surface;
      each pair of alternating south and north pole PMs includes one of the core saliencies arranged therebetween;
      each of the core saliencies is arranged between one south pole PM and one north pole PM;
      the plurality of core saliencies is phase-angle shifted relative to the plurality of alternating south and north pole PMs thereby to thereby alter magnetic reluctance of the electric motor; and
      in each pair of alternating south and north pole PMs, the respective core saliency is disposed angularly closer either to the corresponding south pole PM than to the corresponding north pole PM or to the corresponding north pole PM than to the corresponding south pole PM.

12. The rotor according to claim 11, wherein each of the plurality of alternating south and north pole PMs is a respective PM set including a comparatively high radial span PM and a comparatively low radial span PM.

13. The rotor according to claim 12, wherein, in each PM set, the comparatively low radial span PM is arranged radially closer to the rotational axis than the comparatively high radial span PM.

14. The rotor according to claim 12, wherein, in each PM set, the comparatively high radial span PM is arranged radially closer to the rotational axis than the comparatively low radial span PM.

15. The rotor according to claim 12, wherein each of the core saliencies is embedded in the respective PM set adjacent to the comparatively low radial span PM.

16. The rotor according to claim 15, wherein, in each PM set, the comparatively high radial span PM and the comparatively low radial span PM are radially disposed to generate a radially straight PM set edge opposite the embedded saliency.

17. The rotor according to claim 15, wherein, in each PM set, the embedded saliency extends to overlap an edge of at least one of the comparatively high radial span PM and the comparatively low radial span PM and thereby mechanically retain the respective PM on the rotor.

18. The rotor according to claim 11, wherein the respective core saliency being disposed angularly closer to the corresponding south pole PM than to the corresponding north pole PM is configured to increase torque output and affect torque ripple of the electric motor.

19. The rotor according to claim 11, wherein the respective core saliency being disposed angularly closer to the corresponding north pole PM than to the corresponding south pole PM is configured to decrease torque output of the electric motor.

20. An axial flux electric motor comprising:
   a rotationally fixed stator defining a rotational axis and having a plurality of conductive stator magnetic poles arranged radially about the rotational axis;
   a first rotor spaced axially from one side from the stator, having a first rotor exterior surface facing the stator, and rotatably mounted coaxially with the rotational axis, wherein:
      the first rotor includes a first ferromagnetic rotor core and a plurality of first alternating south and north pole permanent magnets (PMs) arranged on the first ferromagnetic rotor core symmetrically around the rotational axis and facing the stator;
      the first ferromagnetic rotor core includes a plurality of first core saliencies extending to the first rotor exterior surface;
      each of the first core saliencies is arranged between one first south pole PM and one first north pole PM; and
      the plurality of first core saliencies is phase-angle shifted relative to the plurality of first alternating south and north pole PMs to thereby alter magnetic reluctance of the electric motor; and
   a second rotor spaced axially from another side from the stator, having a second rotor exterior surface facing the stator, and rotatably mounted coaxially with the rotational axis, wherein:
      the second rotor includes a second ferromagnetic rotor core and a plurality of second alternating south and north pole PMs arranged on the second ferromagnetic rotor core symmetrically around the rotational axis and facing the stator;
      the second ferromagnetic rotor core includes a plurality of second core saliencies extending to the second rotor exterior surface;
      each of the second core saliencies is arranged between one second south pole PM and one second north pole PM;
      the plurality of second core saliencies is phase-aligned with or phase-angle shifted relative to the plurality of first core saliencies; and
      the plurality of second alternating south and north pole PMs is phase-angle shifted relative to the plurality of first alternating south and north pole PMs to thereby further alter the motor magnetic reluctance.

\* \* \* \* \*